United States Patent [19]

Loper et al.

[11] Patent Number: 5,822,758
[45] Date of Patent: Oct. 13, 1998

[54] METHOD AND SYSTEM FOR HIGH PERFORMANCE DYNAMIC AND USER PROGRAMMABLE CACHE ARBITRATION

[75] Inventors: Albert John Loper, Cedar Park; Timothy Alan Elliott; Christopher Hans Olson, both of Austin; David J. Shippy, Houston, all of Tex.

[73] Assignee: International Business Machines Corporation, Armonk, N.Y.

[21] Appl. No.: 709,793

[22] Filed: Sep. 9, 1996

[51] Int. Cl.[6] .................................................. G06F 12/00
[52] U.S. Cl. ............................ 711/130; 711/150; 711/151
[58] Field of Search ..................................... 711/130, 149, 711/150, 151

[56] References Cited

U.S. PATENT DOCUMENTS

| | | | |
|---|---|---|---|
| 4,953,081 | 8/1990 | Feal et al. ................................. | 395/291 |
| 5,485,455 | 1/1996 | Dobbins et al. ......................... | 370/255 |
| 5,513,335 | 4/1996 | McClure .................................. | 711/130 |
| 5,689,656 | 11/1997 | Baden et al. ............................ | 395/296 |

*Primary Examiner*—Tod R. Swann
*Assistant Examiner*—Esteban A. Rockett
*Attorney, Agent, or Firm*—Sawyer & Associates; Casimer K. Salys

[57] ABSTRACT

A system and method for improving arbitration of a plurality of events that may require access to a cache is disclosed. In a first aspect, the method and system provide dynamic arbitration. The first aspect comprises first logic for determining whether at least one of the plurality of events requires access to the cache and for outputting at least one signal in response thereto. Second logic coupled to the first logic determines the priority of each of the plurality of events in response to the at least one signal and outputs a second signal specifying the priority of each event. Third logic coupled to the second logic grants access to the cache in response to the second signal. A second aspect of the method and system provides user programmable arbitration. The second aspect comprises a storage unit which allows the user to input information indicating the priority of at least one of the plurality of events and outputs a first signal in response to the information. In the second aspect, first logic coupled to the storage unit determines the priority of each of the plurality of events in response to the first signal and outputs a second signal indicating the priority of each event. Second logic coupled to the first logic grants access to the cache in response to the second signal.

43 Claims, 2 Drawing Sheets

METHOD AND SYSTEM FOR HIGH PERFORMANCE DYNAMIC AND USER PROGRAMMABLE CACHE ARBITRATION

TECHNICAL FIELD

This patent application relates to an improvement in the performance of processing systems employing caches,, and more particularly to a method and system for high performance cache arbitration.

BACKGROUND

Conventional microprocessor systems utilize caches. Often a cache must be accessed by a variety of components during execution of instructions. However, caches may have fewer ports than the number of components which could access the cache. For example, the cache may be single ported and, therefore, able to respond to only one component during each clock cycle. Consequently, a method and system for determining which component can access a cache during a particular clock cycle is required. Conventional methods and systems for arbitrating access to a cache fix the priority of each component. An example of a conventional method and system for cache arbitration is found in conventional superscalar microprocessors.

Conventional superscalar microprocessors utilize a three level memory hierarchy. Thus, a three level cache system is employed. This system is typically comprised of components using internal (L1) caches, an external level two (L2) cache, and a memory. Typical components employing L1 caches are the instruction cache (ICache) and the data cache (DCache).

When a miss occurs in a component having an L1 cache, the L1 cache does not have the information required. Consequently, the component looks to the L2 cache, where the information may be stored. Because misses for L1 caches are routed to the L2 cache, components employing L1 caches must have access to the L2 cache. For example, the ICache and Dcache require access to the L2 cache. In typical superscalar microprocessors, the L2 cache also handles bus snooping operations and accesses to an external buffer. However, the L2 cache is typically single ported. Consequently, only one component can have access to the L2 cache during a particular clock cycle. Because only one component can access the L2 cache at a particular time, a method and system for arbitrating which component can access the L2 cache is required. As with other conventional microprocessors, the arbitration method used in superscalar microprocessors is static. This cache arbitration method fixes the priority of each component having an L1 cache.

The priority of a typical component having an L1 cache depends on several factors. In particular, L1 caches may have different sizes and, therefore, different miss rates. In general, components using larger caches have lower miss rates. Depending on the machine, processes may also require access to particular L1 caches less frequently. Fewer misses are expected to occur in less frequently used L1 caches. A component containing a less frequently accessed L1 cache will require fewer accesses to the L2 cache and, therefore, have a lower priority. Consequently, the smaller the L1 cache or the greater the number of times that the L1 cache is accessed by processes, the higher the priority of the component employing the L1 cache.

In addition, different events for a component may have different priorities. For example, the DCache load and Dcache store may have different priorities because each event may result in a different number of misses. In such a system, the DCache load would have a different priority than the DCache store. Thus, the prioritizing the DCache includes prioritizing each event that could occur within the DCache. This is true for every event in each component accessing the L2 cache.

As with other typical systems, conventional superscalar microprocessors use the above information to predetermine the priority of each component or event requiring access to the L2 cache. Although this prioritization scheme functions, it fails to provide optimal microprocessor performance for the user.

Because the priorities are predetermined, it is possible for a component to swamp the L2 cache. Because of a component's high priority, it may be granted access to the L2 cache even though the component's L1 cache has not undergone a miss. At the same time, the L1 cache of a low priority component may have been missed. Because of its priority, the low priority component cannot gain access to the L2 cache. The L2 cache is, therefore, swamped. Consequently, the process using the low priority component cannot be completed until the low priority component is granted access to the L2 cache to obtain the information stored in the L2 cache. Thus, the efficiency of the microprocessor is reduced.

Typical performance monitors, such as those used by compilers, only supply information on the microprocessor's performance. Thus, the performance monitor can only report swamps of the L2 cache. Similarly, even conventional dynamic performance monitors cannot dynamically adjust the microprocessor's execution when the L2 cache is swamped. Consequently, conventional performance monitors are incapable of accounting for changes in the performance of the microprocessor due to swamping of the L2 cache.

In addition to the failure to provide optimal performance, conventional static cache arbitration scheme is inflexible. As discussed above, the probability of a miss in a component employing a particular L1 cache is partially dependent upon the processes being run. The processes being run are, in turn, partly dependent upon the customer. Thus, the priority of a component employing an L1 cache is dependent on the customer. Although general information on customers' use is available, any static priority scheme will not be adaptable to a particular customer. Consequently, typical cache arbitration methods are not flexible enough to provide optimal performance to a particular user.

Accordingly, what is needed is an improved, flexible system and method for arbitrating access to a cache.

SUMMARY

These needs are met and a method and system is provided for improved arbitration of access of a plurality of events to a cache. The first aspect of the method and system provides dynamic arbitration. The first aspect comprises first logic for determining whether at least one of the plurality of events requires access to the cache and for outputting at least one signal in response thereto. Second logic coupled to the first logic determines the priority of each of the plurality of events in response to the at least one signal and outputs a second signal specifying the priority of each event. Third logic coupled to the second logic grants access to the cache in response to the second signal.

A second aspect of the method and system provides user programmable arbitration. The second aspect comprises a storage unit which allows the user to input information indicating the priority of at least one of the plurality of events and outputs a first signal in response to the information input by the user. First logic determines the priority of each of the plurality of events in response to the first signal and outputs a second signal specifying the priority of each event. Second logic coupled to the first logic grants access to the cache in response to the second signal.

Accordingly the disclosed system and method increases the efficiency of cache arbitration, thereby increasing overall system performance.

DETAILED DESCRIPTION

Figure 1:
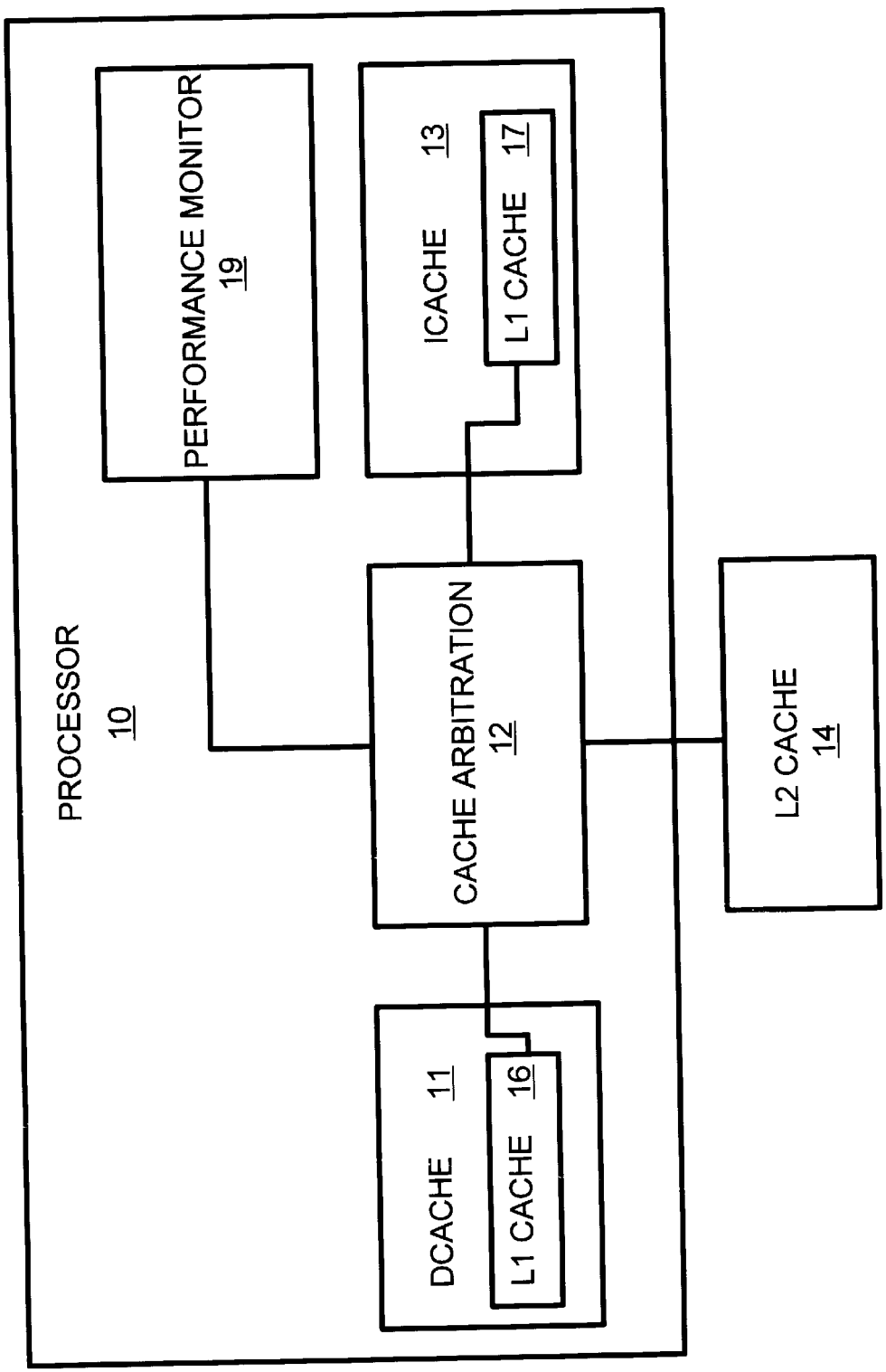
FIG. 1 is a block diagram of one embodiment of a processor employing the method and system.

The illustrative embodiment relates to an improvement in cache arbitration. The following description is presented to enable one of ordinary skill in the art to make and use the illustrative embodiment and is provided in the context of a patent application and its requirements. Various modifications to the preferred embodiment will be readily apparent to those skilled in the art and the generic principles herein may be applied to other embodiments. Thus, the illustrative embodiment is not intended to be limited to the embodiment shown but is to be accorded the widest scope consistent with the principles and features described herein. In addition, reference is made to superscalar environments. However, the method and system are fully applicable to other environments and other caches that can be accessed by different components or different events.

Conventional superscalar processors utilize a three level memory hierarchy. The first level includes components, such as the instruction cache (ICache) and the data cache (DCache), having internal level one (L1) caches. The second level utilizes external, level two caches (L2 cache). When a process cannot find the required information in the L1 cache of a particular component, a "miss" occurs. If a miss occurs in a component having an L1 cache, the L2 cache is next queried to find the information. Because the L2 cache is accessed after a miss in an L1 cache, a component having an L1 cache is typically coupled to the L2 cache. For example, the ICache and Dcache are typically coupled to an L2 cache. In conventional superscalar environments, the L2 also handles bus snooping activities and accesses to a buffer when the desired data is not present in the L2 cache. Finally, another external L3 cache is employed.

Typical L2 caches are single ported. However, processes may use more than one component requiring access to the L2 cache. For example, a process may use both the ICache and DCache. Misses may also occur in more than one component having an L1 cache. Consequently, more than one component may require access to the L2 cache during a single clock cycle. For example, if there a miss of both the ICache and DCache, both components may require access to the L2 cache. Because the L2 cache is single ported, however, two components cannot have access the L2 cache during the same clock cycle. Consequently, a method of determining which component having an L1 cache accesses the L2 cache is required.

Conventional superscalar processors determine which component containing L1 cache can access the L2 cache during a particular clock cycle using cache arbitration. Typically, cache arbitration is performed statically, by fixing the priorities of each component. A component having a higher priority will be allocated a greater number of clock cycles in which it can access the L2 cache.

For example, the L1 cache in the DCache may be significantly smaller than the L1 cache in the ICache. The microprocessor may also require data from the DCache more frequently. In such a system, the priority of the DCache is higher than the priority of the ICache. In addition, different events for a single component may have different priorities because each event may result in a different number of misses. For example, the DCache load and Dcache store may have different priorities. Thus, prioritizing the DCache includes prioritizing each event that could occur within the DCache. Typical arbitration methods fix the priority of each event and, therefore, each component based on information known about the system and the processes to be run on the system.

Although conventional systems are functional, one of ordinary skill in the art will realize that fixing the priorities of components or events will not optimize performance in many systems. This is because a component having a high priority for L2 cache access, but not having the highest priority need at this point of time for access to an L2 cache, may prevent another component from accessing the L2 cache. For example, the DCache may have higher priority than the ICache because the DCache usually requires access to the L2 cache more often. In such a system, the DCache may swamp the L2 cache. The DCache swamps the L2 cache when the DCache is repeatedly given access to the L2 cache despite the fact that a low priority component, such as the ICache, requires access to the L2 cache because of a miss. When the ICache is unable to access the L2 cache, operating instructions cannot be obtained, thereby lowering the speed of microprocessor. Consequently, the microprocessor's performance is adversely affected.

Conversely, if the ICache is given higher priority than the DCache, the Icache can gain access to future instructions stored in the L2 cache. However, the priority of the DCache was set at a high value because the processor frequently requires data to complete an instruction. Consequently, instructions cannot be carried out until sufficient data is obtained. If there is a miss in the DCache, sufficient data cannot be obtained until the DCache is given access to the L2 cache. Although the DCache requires data from the L2 cache, the DCache may not be rapidly granted access to the L2 cache because the priority of the DCache is too low. In this situation, the ICache swamps the L2 cache. Thus, fixing the priority of the ICache higher than that of the DCache will also lower the speed of processing, thereby degrading the performance of the system.

In addition to the problem discussed above, an additional complication is introduced by the fact that different architectures have different properties. In addition, different embodiments of the same architectures have different properties. Consequently, the optimum priorities of components, such as the ICache and Dcache, or events will depend on the particular architecture. For example, a floating point unit requires frequent access to data in order to optimize performance. Thus, Dcache priority is important. On the other hand, other architectures may require frequent access to instructions. Icache priority is important in these systems. Conventional cache arbitration schemes would function well in only one, but not both of these environments.

In addition, different applications require access to L1 caches at different intervals. The applications run are largely determined by the customer base for the system. Consequently, depending on the customer's use of the system, the optimum priority for each L1 cache may change. However, it is difficult to determine in advance what applications a customer would use. Because of this, conventional priority schemes fail to provide optimal performance in a variety of environments.

Although some information on customers' use and the instructions run on the microprocessors is available, each user is unique. Consequently, the customer might desire a different priority from the static priority scheme for some uses. Because the priorities of all components are fixed in conventional arbitration schemes, typical microprocessors cannot be adapted to fit a particular customer's needs.

Even if a conventional priority scheme could grant optimal performance in an environment, it may be difficult to provide the correct priority scheme. In addition to not knowing the details of each customer's use, another problem with conventional, static priority schemes is that these schemes must be fixed early in the architecting of the system. Later, implementation problems may expose reasons to change the priority scheme. However, changing the priority scheme farther along in the architecting process may be expensive and difficult. Consequently, even though the optimal conventional priority scheme could be discovered, it may be difficult to implement.

The illustrative embodiment provides a method and system allowing for dynamic cache arbitration and/or user programmable cache arbitration. In dynamic cache arbitration, the method and system monitor the performance of the microprocessor and adjust the priorities of events which could require access to the L2 cache and, therefore, components having L1 caches, in order to prevent the L2 cache from swamping. Microprocessor performance is thereby enhanced. In user programmable arbitration, the user is allowed to set the priorities of events that may require access to the L2 cache in order to customize the cache arbitration method and system to the user's own particular needs. Thus, the method and system also provide for more flexible cache arbitration.

To more particularly illustrate the method and system in accordance with the illustrative embodiment, refer now to FIG. 1 depicting a block diagram of a processor using one embodiment of such a system. The processor 10 in FIG. 1 contains ICache 11, DCache 13, and cache arbitration system 12. ICache 11 contains L1 cache 16. DCache 13 contains L1 cache 17. ICache 11 and DCache 13 are connected to external L2 cache 14 through the cache arbitration system 12. Although processor 10 may contain other components, including other components requiring access to the L2 cache, only the ICache 11, cache arbitration system 12, Dcache 13, and performance monitor 19 are shown.

Figure 2:
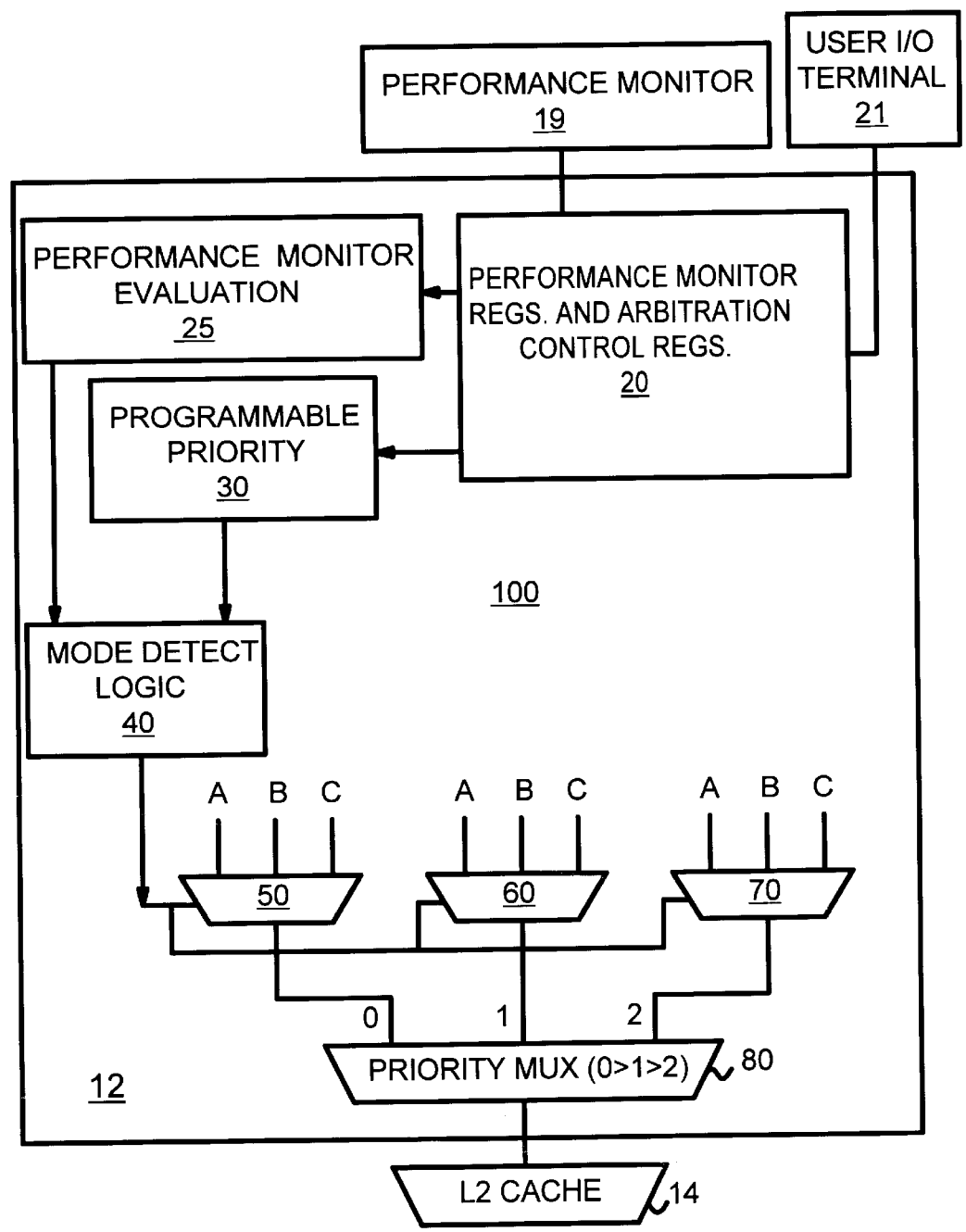
FIG. 2 is a more detailed block diagram of one embodiment of the method and system.

A more detailed diagram of one embodiment of cache arbitration system 12 is shown in FIG. 2. Referring now to FIG. 2, cache arbitration system 12 is capable of performing both dynamic cache arbitration and user programmable cache arbitration. However, these functions are separable. Consequently, a different embodiment could perform only dynamic cache arbitration or only user programmable cache arbitration.

In one aspect of the method and system, the cache arbitration system 12 dynamically performs cache arbitration. In this aspect of the method and system, the performance monitor 19 inputs information regarding the state of the microprocessor to performance monitor and arbitration control registers ("registers") 20. In one embodiment of the method and system, the registers 20 comprise program manageable special purpose registers. In one embodiment of the method and system, performance monitor 19 monitors the status of each event that may require access to L2 cache 14. Thus, the performance monitor 19 senses when the L2 cache is beginning to swamp and inputs information to the appropriate entry in registers 20.

Although the present embodiment employs performance monitor 19, this should not be construed to mean that a performance is necessary to the method and system. The method and system merely require is the ability to sense when the L2 cache 14 is beginning to swamp. Consequently, the performance monitor 19 could be replaced by another mechanism for monitoring whether a particular event requires access to L2 cache 14, but may be being denied access due to the priority of another event.

The registers 20 then output a signal. Performance monitor evaluation 25 adjusts the priority of particular components in response to the signal output by registers 20. Note that in the context of this application, a first component outputting a signal can be construed to mean either that information contained in a first component can be accessed by a second component, for example by reading data stored in the first component, or that the first component automatically delivers a signal to a second component. Thus, either the performance monitor evaluation 25 can access the information in the registers 20, for example by reading the registers 20, or the registers 20 can automatically deliver a signal to performance monitor 25. In either case, because the performance monitor evaluation 25 acts in response to a signal output by registers 20, the priorities are changed in order to prevent the L2 cache from swamping.

For example, when the DCache 11 is beginning to swamp L2 cache 14, ICache 13 cannot obtain access to the L2 cache 14 frequently enough to ensure a continuous supply of instructions. The performance monitor 19 senses this, and rapidly changes the setting of the appropriate entry in registers 20. To enhance performance, performance monitor evaluation 25 then automatically raises the priority of the ICache 13 in response to a signal output by registers 20. As the ICache 13 gains access to the L2 cache 14 and receives a sufficient number of instructions from L2 cache 14, the performance monitor 19 recognizes this situation. In response, the performance monitor 19 switches the entry in registers 20. Performance monitor evaluation 25 then lowers the priority of ICache 13 in response to a signal output by registers 20. Thus, the priority scheme is automatically and continuously adjusted to prevent swamping of the L2 cache 14.

Note that the method and system for dynamic cache arbitration takes into account not only the priorities of individual components, but also the priorities of particular events for each component. The method and system are capable of dynamically prioritizing events such as the DCache load, DCache store, ICache load, rather than simply monitoring and prioritizing components undergoing the events, such as the DCache and ICache. Thus, the method and system switch entries in registers 20 corresponding to particular events requiring access to the L2 cache in order to prevent the L2 cache 14 from swamping.

In another aspect of the method and system, cache arbitration system 12 allows for the programming of priorities of particular events. Consequently, the user can set arbitration priorities for particular applications. In one embodiment of the method and system, this is accomplished using an implementation dependency register in the processor to set the priorities of each event that could access the L2 cache. In the embodiment of the cache arbitration system 12 shown in FIG. 2, registers 20 are used both as registers for dynamic cache arbitration and for user programmable cache arbitration. Information is provided by the user through user input/output terminal 21. In one embodiment of the method and system, the user input/output terminal 21 is a keyboard.

In one embodiment of the method and system, the user sets priorities by specifying the order, from highest to lowest priority, of events that could require access to the L2 cache 14. The programmable priority 30 then determines the actual priority of events in response to a signal output by the registers 20. As discussed with respect to dynamic cache arbitration, a signal output by the registers 20 can be construed to mean either information contained in registers 20 which the programmable priority 30 can access, for example by reading data stored in the registers 20, or a signal which registers 20 automatically deliver to the programmable priority 30.

For example, if there are three events which could require access to the L2 cache, A; B; and C; there are six potential priority schemes: A>B>C, A>C>B, B>C>A, B>A>C, C>A>B, and C>B>A. Thus, three bits are required to determine which priority scheme is used. By setting these three bits in the registers 20, the user specifies the priority of the three events which could require access to the L2 cache. Programmable priority 30 determines which of the six possible priority schemes has been chosen by the user in response a signal output by register 20 indicating the values of the three bits in register 20. Note that in one embodiment, the system provides a default set of priorities which the user can change. However, the priorities could remain open until the user inputs information specifying event priorities.

In the embodiment shown, mode detect logic 40 determines whether the user programmed arbitration or dynamic cache arbitration is to be performed. If dynamic arbitration is to be performed, the mode detect logic 40 outputs a signal to multiplexers (MUXs) 50, 60, and 70 indicating priorities in response to the signal output by the performance monitor evaluation 25. Similarly, if user programmed arbitration is to be performed, then the mode detect logic 40 outputs a signal to MUXs 50, 60, and 70 indicating the priorities in response to the signal output by programmable priority 30.

In response to the signal from mode detect logic 40, MUX 50 outputs the event of highest priority. Similarly, MUX 60 outputs the next highest priority event. Finally, MUX 70 outputs the lowest priority event in response to a signal from mode detect logic 40. The combination of MUXs 50–70 and mode detect logic 40 outputs the highest to lowest priority event, with the MUX farthest left outputting the highest priority event. For example, assume the inputs 100 to MUXs 50–70 are events A, B, and C. Suppose that the highest priority event is event C and the lowest priority event is event B. In this situation, mode detect logic 40 causes MUX 50 to output C. Similarly, MUXs 60 and 70 output events A and B, respectively.

The 0 input to priority MUX 80 is the output of MUX 50. The 1 input the priority MUX 80 is the output of MUX 60. The 2 input to priority MUX 80 is the output of MUX 70. Priority MUX 80 allows one access per clock cycle to L2 cache 14 based on a fixed priority scheme of 0>1>2. Because MUXs 50, 60, and 70 output the highest priority event, the second highest priority event, and the lowest priority event, respectively, priority MUX 80 will allow accesses to L2 cache 14 based on the priorities determined by the performance monitor evaluation 25 or programmable priority 30. Thus, the priorities are adjusted either according to the microprocessor performance, thereby preventing swamping of the L2 cache, or according to priorities chosen by the user. Consequently, microprocessor performance and flexibility is improved.

A method and system has been disclosed for high performance cache arbitration. Because the method and system allow the arbitration to be chosen by the user or dynamically respond to the conditions present in the microprocessor, the efficiency of the cache is improved. Consequently, microprocessor performance is enhanced.

Although the system and method has been described in accordance with the embodiments shown, one of ordinary skill in the art will readily recognize that there could be variations to the embodiments and those variations would be within the spirit and scope of the above described system and method. Accordingly, many modifications may be made by one of ordinary skill in the art without departing from the spirit and scope of the appended claims.

What is claimed is:

1. A system for a dynamic arbitration of access by a plurality of events to a cache comprising:

first logic for determining whether at least one of the plurality of events requires access to the cache and for outputting at least one signal in response thereto;

second logic coupled to the first logic for determining the priority of each of the plurality of events in response to the at least one signal and for outputting a second signal specifying the priority of each event; and third logic coupled to the second logic for granting access to the cache in response to the second signal specifying the priority of each event, the third logic comprising a first tier of a plurality multiplexers such that each multiplexer of the first tier corresponds to a particular priority and provides one of the plurality of events having the particular priority, and a second tier of at least one multiplexer coupled to the first tier, the second tier for granting access to the cache according to the particular priority of each multiplexer of the first tier.

2. The system of claim 1 wherein the first logic further comprises a program manageable special purpose register.

3. The system of claim 2 wherein the second logic further includes a performance monitor evaluation for automatically adjusting the priority of one of the plurality of events in response to a signal output from the program manageable special purpose register.

4. The system of claim 3 wherein the cache is a single ported cache.

5. The system of claim 4 wherein the cache is a level two cache and wherein the plurality of events further comprises events requiring access to a level one cache.

6. The system of claim 1 wherein the first logic further comprises a performance monitor.

7. The system of claim 6 wherein the first logic further comprises a program manageable special purpose register.

8. A system for a user programmable arbitration of access by a plurality of events to a cache comprising:

a logic unit for allowing the user to input information indicating the priority of at least one of the plurality of events and for outputting a first signal in response to the information;

first logic coupled to the logic unit for determining the priority of each of the plurality of events in response to the first signal and for outputting a second signal specifying the priority of each event; and second logic coupled to the first logic, for granting access to the cache in response to the second signal specifying the priority of each event, the second logic comprising a first tier of a plurality of multiplexers such that each multiplexer of the first tier corresponds to a particular priority and provides one of the plurality of events having the particular priority, and a second tier of at least one multiplexer coupled to the first tier, the second tier for granting access to the cache according to the particular priority of each multiplexer of the first tier.

9. The system of claim 8 wherein the logic unit further comprises a register.

10. The system of claim 8 wherein the information input by the user further comprises at least one bit indicating order of the at least one event and at least a second of the plurality of events.

11. The system of claim 10 wherein the cache is a single ported cache.

12. The system of claim 11 wherein the cache is a level two cache; and wherein the plurality of events further comprises events requiring access to a level one cache.

13. A system for a dynamic arbitration and a user programmable arbitration of access by a plurality of events to a cache comprising:
- a first logic for determining whether at least one of the plurality of events requires access to the cache, and for outputting at least one signal in response thereto;
- second logic coupled to the first logic for determining the priority of each of the plurality of events in response to the at least one signal and for outputting a second signal specifying the priority of each event;
- a logic unit for allowing the user to input information indicating the priority of at least one of the plurality of events and for outputting a third signal in response to the information;
- third logic coupled to the logic unit for determining the priority of each of the plurality of events in response to the third signal and for outputting a fourth signal specifying the priority of each event;
- a mode detector coupled with the second logic and the third logic, the mode detector for determining whether dynamic or user programmable arbitration will be performed and for outputting a fifth signal, the fifth signal being in response to the second signal when dynamic arbitration is to be performed, and the fifth signal being in response to the fourth signal when user programmable arbitration is to be performed;
- fourth logic coupled to the mode detector, for granting access to the cache in response to the fifth signal.

14. The system of claim 13 wherein the fourth logic further comprises:
- a first tier of a plurality of multiplexers, each multiplexer of the first tier corresponding to a particular priority, each multiplexer of the first tier for providing one of the plurality of events having the particular priority; and
- a second tier of at least one multiplexer, the second tier coupled to the first tier, the second tier for granting access to the cache according to the particular priority of each multiplexer of the first tier.

15. The system of claim 14 wherein the information input by the user further comprises at least one bit indicating order of the at least one of the plurality of events and at least a second of the plurality of events.

16. The system of claim 15 wherein the first logic further comprises a program manageable register.

17. The system of claim 16 wherein the cache is a single ported cache.

18. The system of claim 17 wherein the cache is a level two cache and wherein the plurality of events further comprises events requiring access to a level one cache.

19. The system of claim 15 wherein the first logic further comprises a performance monitor.

20. The system of claim 19 wherein the first logic further comprises a program manageable special purpose register.

21. A system for a dynamic arbitration of access by a plurality of events to a cache in a computer system including a processor comprising:
- first logic for monitoring the processor, for determining whether at least one of the plurality of events requires access to the cache, and for outputting at least one signal in response thereto;
- second logic coupled to the first logic for determining the priority of each of the plurality of events in response to the at least one signal and for providing a second signal specifying the priority of each event; and
- third logic coupled to the second logic, for granting access to the cache in response to the second signal specifying the priority of each event, the third logic comprising a first tier of a plurality of multiplexers such that each multiplexer of the first tier corresponds to a particular priority and provides one of the plurality of events having the particular priority, and a second tier of at least one multiplexer, the second tier coupled to the first tier, the second tier for granting access to the cache according to the particular priority of each multiplexer of the first tier.

22. The system of claim 21 wherein the first logic further comprises a program manageable special purpose register.

23. The system of claim 22 wherein the second logic further includes a performance monitor evaluation for automatically adjusting the priority of one of the plurality of events in response to a signal output from the program manageable special purpose register.

24. The system of claim 23 wherein the cache is a single ported cache.

25. The system of claim 24 wherein the cache is a level two cache and wherein the plurality of events further comprises events requiring access to a level one cache.

26. A system for a dynamic arbitration and a user programmable arbitration of access by a plurality of events to a cache in a computer system including a processor comprising:
- a first logic for determining whether at least one of the plurality of events requires access to the cache, and for outputting at least one signal in response thereto;
- second logic coupled to the first logic for determining the priority of each of the plurality of events in response to the at least one signal and for providing a second signal specifying the priority of each event;
- a logic unit for allowing the user to input information indicating the priority of at least one of the plurality of events and for providing a third signal in response to the information;
- third logic coupled to the logic unit for determining the priority of each of the plurality of events in response to the third signal and for outputting a fourth signal specifying the priority of each event;
- a mode detector coupled with the first logic and the third logic, for determining whether dynamic or user programmable arbitration will be performed and for outputting a fifth signal, the fifth signal being in response to the second signal when dynamic arbitration is to be performed, and the fifth signal being in response to the fourth signal when user programmable arbitration is to be performed;
- fourth logic coupled to the mode detector, for granting access to the cache in response to the fifth signal.

27. The system of claim 26 wherein the fourth logic further comprises:
- a first tier of a plurality of multiplexers, each multiplexer of the first tier corresponding to a particular priority, each multiplexer of the first tier for providing one of the plurality of events having the particular priority; and
- a second tier of at least one multiplexer, the second tier coupled to the first tier, the second tier for granting access to the cache according to the particular priority of each multiplexer of the first tier.

28. The system of claim 27 wherein the information input by the user further comprises at least one bit indicating order of the at least one of the plurality of events and at least a second of the plurality of events.

29. The system of claim 28 wherein the first logic further comprises a program manageable register.

30. The system of claim 29 wherein the cache is a single ported cache.

31. The system of claim 30 wherein the cache is a level two cache and wherein the plurality of events further comprises events requiring access to a level one cache.

32. A method for a dynamic arbitration of access by a plurality of events to a cache comprising the steps of:
   a) determining whether at least one of the plurality of events requires access to the cache;
   b) outputting at least one signal in response to the determination of whether the at least one of the plurality of events requires access to the cache;
   c) determining the priority of each of the plurality of events in response to the at least one signal;
   d) outputting a second signal specifying the priority of each event; and
   e) granting access to the cache in response to the second signal specifying the priority of each event, including providing each of the plurality of events to a first tier of a plurality of multiplexers wherein each multiplexer of the first tier corresponds to a particular priority, outputting a signal comprising one of the plurality of events corresponding to the particular priority from each multiplexer of the first tier to a second tier of at least one multiplexer wherein the second tier of at least one multiplexer is for granting access to the cache, and granting access to the cache according to the particular priority.

33. The method of claim 32 wherein the cache is a single ported cache.

34. The method of claim 33 wherein the cache is a level two cache and wherein the plurality of events further comprises events requiring access to a level one cache.

35. A method for a user programmable arbitration of access by a plurality of events to a cache comprising the steps of:
   a) providing information input by the user, the information indicating the priority of at least one of the plurality of events;
   b) outputting a first signal in response to the information input by the user;
   c) determining the priority of each of the plurality of events in response to the signal;
   d) outputting a second signal specifying the priority of each event; and
   e) granting access to the cache in response to the second signal specifying the priority of each event, including providing each of the plurality of events to a first tier of a plurality of multiplexers wherein each multiplexer of the first tier corresponds to a particular priority, providing a multiplexer output comprising one of the plurality of events corresponding to the particular priority from each multiplexer of the first tier to a second tier of at least one multiplexer wherein the second tier of at least one multiplexer is for granting access to the cache, and granting access to the cache to the particular priority.

36. The method of claim 35 wherein the information input by the user further comprises at least one bit indicating order of the at least one of the plurality of events and at least a second of the plurality of events.

37. The method of claim 36 wherein the cache is a single ported cache.

38. The method of claim 37 wherein the cache is a level two cache and wherein the plurality of events further comprises events requiring access to a level one cache.

39. A method for a dynamic arbitration and a user programmable arbitration of access by a plurality of events to a cache comprising the steps of:
   a) determining whether at least one of the plurality of events requires access to the cache;
   b) outputting at least one signal in response to the determination of whether the at least one of the plurality of events requires access to the cache;
   c) determining the priority of each of the plurality of events in response to the at least one signal;
   d) outputting a second signal indicating the priority of each event;
   e) providing information input by the user, the information determining the priority of at least one of the plurality of events;
   f) outputting a third signal in response to the information;
   g) determining the priority of each of the plurality of events in response to the third signal;
   h) outputting a fourth signal indicating the priority of each event;
   i) outputting a fifth signal, the fifth signal being in response to the second signal if the dynamic arbitration is to be performed, and the fifth signal being in response to the fourth signal if the user programmable arbitration is to be performed; and
   j) granting access to the cache in response to the fifth signal.

40. The method of claim 39 wherein the information input by the user further comprises at least one bit indicating order of the at least one of the plurality of events and at least a second of the plurality of events.

41. The method of claim 40 wherein the cache is a single ported cache.

42. The method of claim 41 wherein the cache is a level two cache and wherein the plurality of events further comprises events requiring access to a level one cache.

43. The method of claim 42 wherein cache access granting step (j) further comprises the steps of:
   j1) providing each of the plurality of events to a first tier of a plurality of multiplexers, each multiplexer of the first tier corresponding to a particular priority;
   j2) providing a multiplexer output from each multiplexer of the first tier to a second tier of at least one multiplexer, the multiplexer output further comprising a one of the plurality of events corresponding to the particular priority, the second tier for granting access to the cache; and
   j3) granting access to the cache according to the cache according to the particular priority of each multiplexer of the first tier of at least one multiplexer.

* * * * *